United States Patent
Chang et al.

(10) Patent No.: US 12,510,782 B2
(45) Date of Patent: Dec. 30, 2025

(54) BACKLIGHT MODULE AND DISPLAY DEVICE

(71) Applicant: Radiant Opto-Electronics Corporation, Kaohsiung (TW)

(72) Inventors: Chung-Cheng Chang, Kaohsiung (TW); Pei-Fen Hou, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 18/909,103

(22) Filed: Oct. 8, 2024

(65) Prior Publication Data
US 2025/0102860 A1 Mar. 27, 2025

Related U.S. Application Data

(63) Continuation of application No. PCT/CN2023/126776, filed on Oct. 26, 2023.

(30) Foreign Application Priority Data

Sep. 21, 2023 (CN) .......................... 202311226119.6

(51) Int. Cl.
*G02F 1/13357* (2006.01)

(52) U.S. Cl.
CPC .. *G02F 1/133605* (2013.01); *G02F 1/133608* (2013.01)

(58) Field of Classification Search
CPC ......... G02F 1/133605; G02F 1/133608; G02F 1/133314; G02F 1/133317; G02F 1/13332; G02F 1/133325; G02F 1/133603; G02F 1/13325; F21Y 2105/16; F21V 7/0083

See application file for complete search history.

(56) References Cited

U.S. PATENT DOCUMENTS

| | | | |
|---|---|---|---|
| 2007/0103915 A1* | 5/2007 | Chang ............... | G02F 1/133608 362/362 |
| 2016/0356952 A1* | 12/2016 | Kawabata ............... | F21V 17/00 |
| 2016/0377908 A1* | 12/2016 | Shin .................. | G02F 1/133308 349/58 |

FOREIGN PATENT DOCUMENTS

| | | | |
|---|---|---|---|
| CN | 205899193 | | 1/2017 |
| CN | 206191420 | | 5/2017 |
| CN | 206191420 U | * | 5/2017 |
| CN | 206695074 | | 12/2017 |
| CN | 110275350 | | 9/2019 |
| CN | 209343097 | | 9/2019 |
| CN | 209343097 U | * | 9/2019 |

(Continued)

*Primary Examiner* — Erin Kryukova
(74) *Attorney, Agent, or Firm* — BACON & THOMAS, PLLC (57) ABSTRACT

A backlight module has a reflective sheet and a light board. The reflective sheet has a body and two side walls located on two sides of the body and being opposite to each other. Each side wall has a tab. A storage space of the reflective sheet is formed between said tabs on the two side walls, the two side walls, and a bottom of the body. Each side of the light board has a recess portion recessed thereon for corresponding to the tab on the side wall of the reflective sheet. The light board is located in the storage space and limited on the reflective sheet by the tab. A display has the aforementioned backlight module and a display panel. The display panel is connected with the backlight module, and the light board faces toward the display panel.

12 Claims, 13 Drawing Sheets

(56) References Cited

FOREIGN PATENT DOCUMENTS

| | | | | |
|---|---|---|---|---|
| CN | 215895186 | | 2/2022 | |
| CN | 216351668 | | 4/2022 | |
| CN | 219245903 | | 6/2023 | |
| JP | 2023037982 A | * | 3/2023 | ....... G02F 1/133603 |
| KR | 1020130031437 | | 3/2013 | |
| TW | 202314158 | | 4/2023 | |
| TW | 202314346 | | 4/2023 | |
| WO | WO-2015015558 A1 | * | 2/2015 | ....... G02F 1/133603 |
| WO | WO-2016155783 A1 | * | 10/2016 | |

\* cited by examiner

BACKLIGHT MODULE AND DISPLAY DEVICE

CROSS-REFERENCE TO RELATED APPLICATIONS

This application is a continuation application of international Application No. PCT/CN2023/126776 filed on Oct. 26, 2023, which claims priority from China Patent Application Serial Number 202311226119.6, filed on Sep. 21, 2023. The entire contents of each of which are incorporated herein by reference.

BACKGROUND OF THE INVENTION

1. Field of the Invention

The present invention relates to a backlight module and a display device having said backlight module.

2. Description of Related Art

Backlight modules are widely applied in display devices as a light source. A conventional direct-type backlight module has a backplate, a light board, and a reflective sheet. The light board is disposed between the backplate and the reflective sheet and is configured to emit light toward a liquid crystal panel above the backlight module.

When assembling the conventional backlight module, the light board and the reflective sheet are mounted to the backplate via screws. However, assembling via screws increases a quantity of components of the backlight module, which not only increases labor time for assembling, reworking, and deburring, but also increases production costs.

SUMMARY OF THE INVENTION

The main objective of the present invention is to provide a backlight module and a display device with reduced components, thereby reducing labor time for assembling, reworking, and deburring as well as production costs.

The backlight module comprises a reflective sheet and a light board. The reflective sheet has a body and two side walls respectively located on two sides of the body and being opposite to each other. Each one of the two side walls has at least one tab. A storage space of the reflective sheet is formed between said tabs of the two side walls, the two side walls, and a bottom of the body. The light board is disposed in the storage space and has multiple light-emitting units and two sides. The multiple light-emitting units are disposed thereon at spaced intervals, and each one of the two sides has at least one recess portion recessed thereon and configured for the at least one tab of a respective one of the two side walls to pass therethrough. Said tabs of the two side walls limit the light board on the reflective sheet.

Since the light board is disposed in the storage space of the reflective sheet and is limited on the reflective sheet by said tabs and the two side walls, the reflective sheet and the light board can be configured to each other without screws, which reduces a quantity of components of the backlight module to reduce labor time for assembling, reworking, and deburring as well as costs of components. Also, the problem of low assembly accuracy caused by assembling a larger quantity of components can be mitigated to improve a yield rate of products.

When mounting the light board to the reflective sheet, said recess portion of the light board is configured for the corresponding tab of the reflective sheet to pass therethrough so as to locate the light board in the storage space. Afterwards, the light board is pushed laterally to allow said tab to abut an edge of said recess portion, which limits the light board on the reflective sheet.

The display device in accordance with the present invention comprises the aforementioned backlight module and a display panel. The display panel is connected with the backlight module. The light board faces toward the display panel.

Applied with the backlight module, the display device may adopt a lower quantity of components so as to mitigate the problem of low assembly accuracy caused by assembling a larger quantity of components and to reduce production cost.

DETAILED DESCRIPTION OF THE PREFERRED EMBODIMENT

With reference to FIGS. 1 to 4, a preferred embodiment of a backlight module in accordance with the present invention has a reflective sheet 10 and a light board 20.

Figure 1:
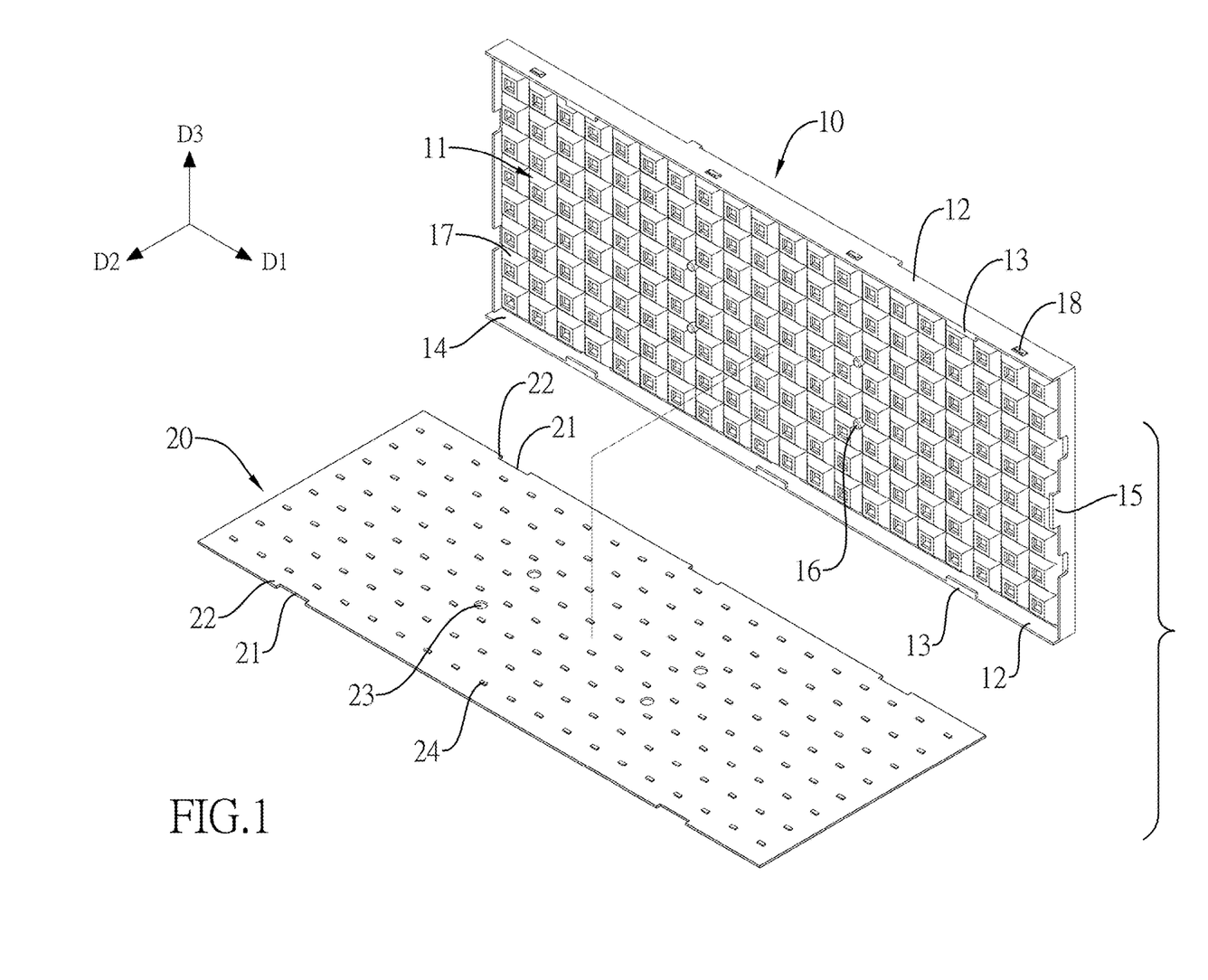
FIG. 1 is an exploded view of a reflective sheet and a light board of an embodiment of a backlight module in accordance with the present invention.
Figure 4:
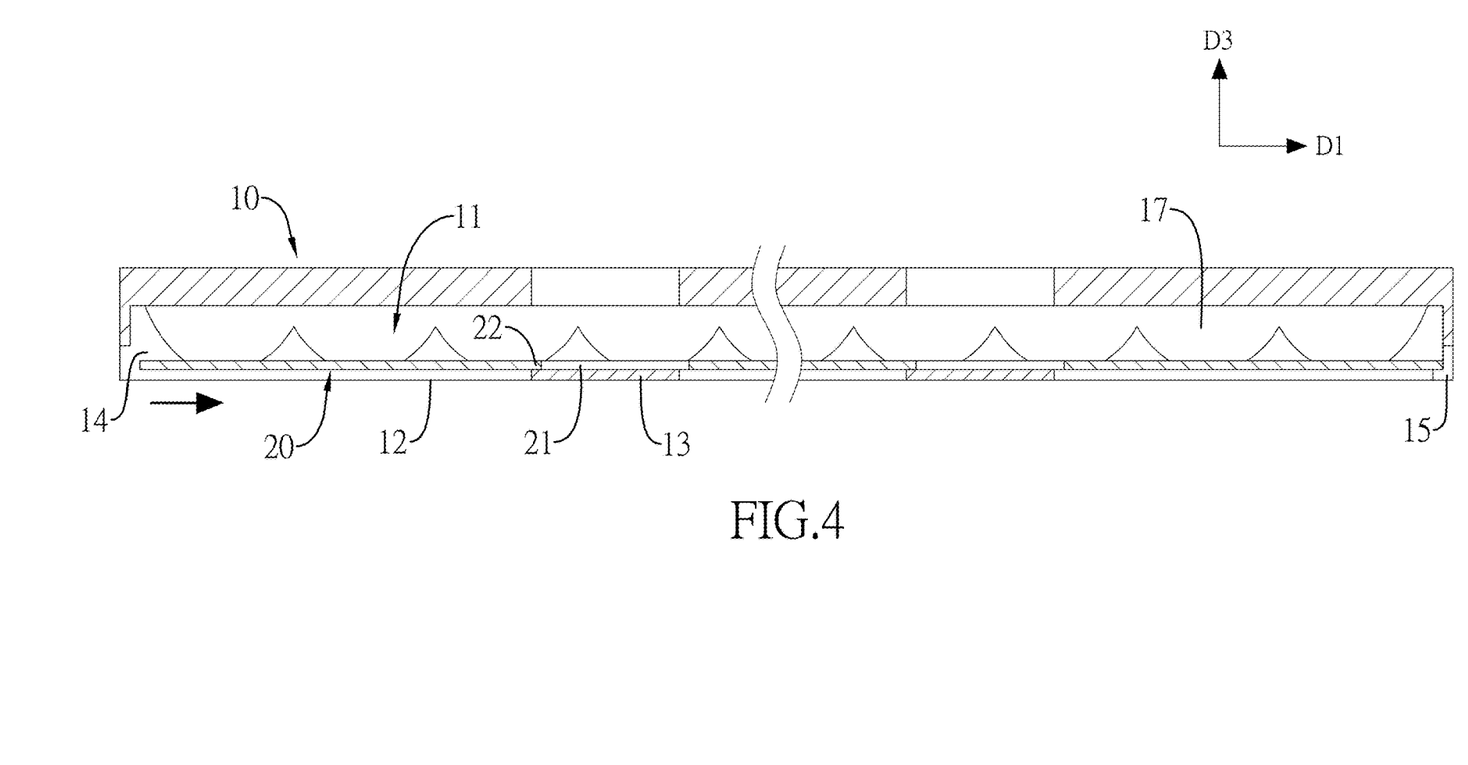
FIG. 4 is a cross-sectional side view across line A-A in FIG. 2.

With reference to FIGS. 1 and 4, the reflective sheet 10 has a body 11, two side walls 12, and a storage space 14. The two side walls 12 are respectively located on two sides of the body 11 and are opposite to each other. Each one of the two side walls 12 has at least one tab 13, and the storage space 14 is formed between said tabs 13 of the two side walls 12, the two side walls 12, and a bottom of the body 11.

Figure 2:
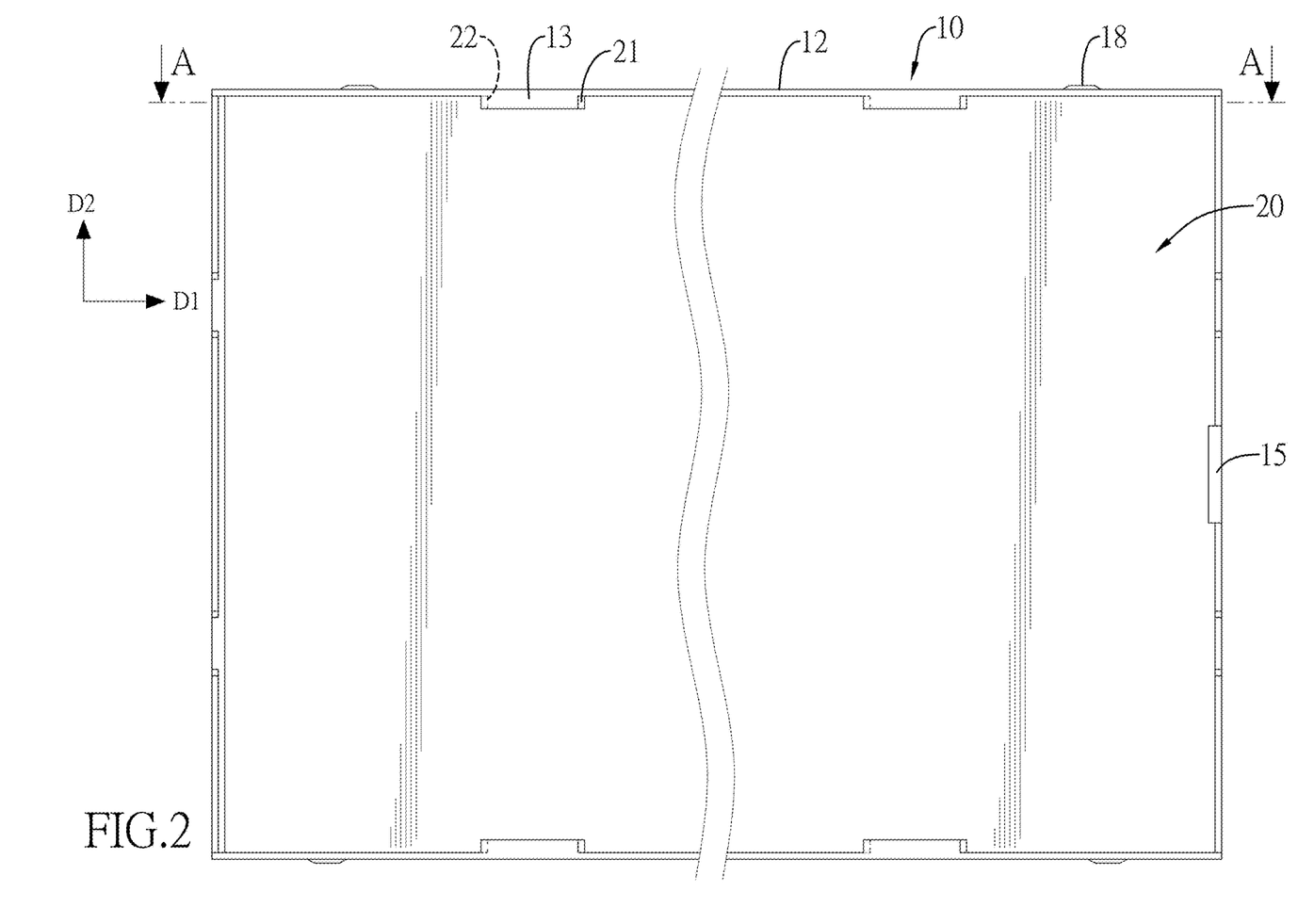
FIG. 2 is a post-assembly bottom side view of the reflective sheet and the light board in FIG. 1.

With reference to FIGS. 1, 2, and 4, the light board 20 has two sides, and each one of the two sides of the light board 20 has at least one recess portion 21 recessed thereon. The at least one recess portion 21 of each one of the two sides of the light board 20 corresponds to the at least one tab 13 on each one of the two side walls 12 of the reflective sheet 10. The light board 20 is located in the storage space 14, and said tabs 13 of the two side walls 12 limit the light board 20 on the reflective sheet 10.

When mounting the light board 20 to the reflective sheet 10 from a bottom side of the reflective sheet 10, said recess portions 21 of the light board 20 allow said tab 13 of the reflective sheet 10 to pass therethrough such that the light board 20 can be located in the storage space 14 and limited on the reflective sheet 10 via said tabs 13 on the two side walls. Thus, the light board 20 and the reflective sheet 10 are connected with each other without screws, which reduces a quantity of components of the backlight module so as to reduce labor time for assembling and reworking as well as production costs. Since the quantity of the components decreases, total flashes or burrs on the components are also reduced to reduce labor time for deburring. Also, the problem of lower assembly accuracy caused by assembling a large quantity of components is mitigated to improve reliability and yield rate of products and to reduce waste of material as well as labor time for reworking due to poor assembly.

Figure 3:
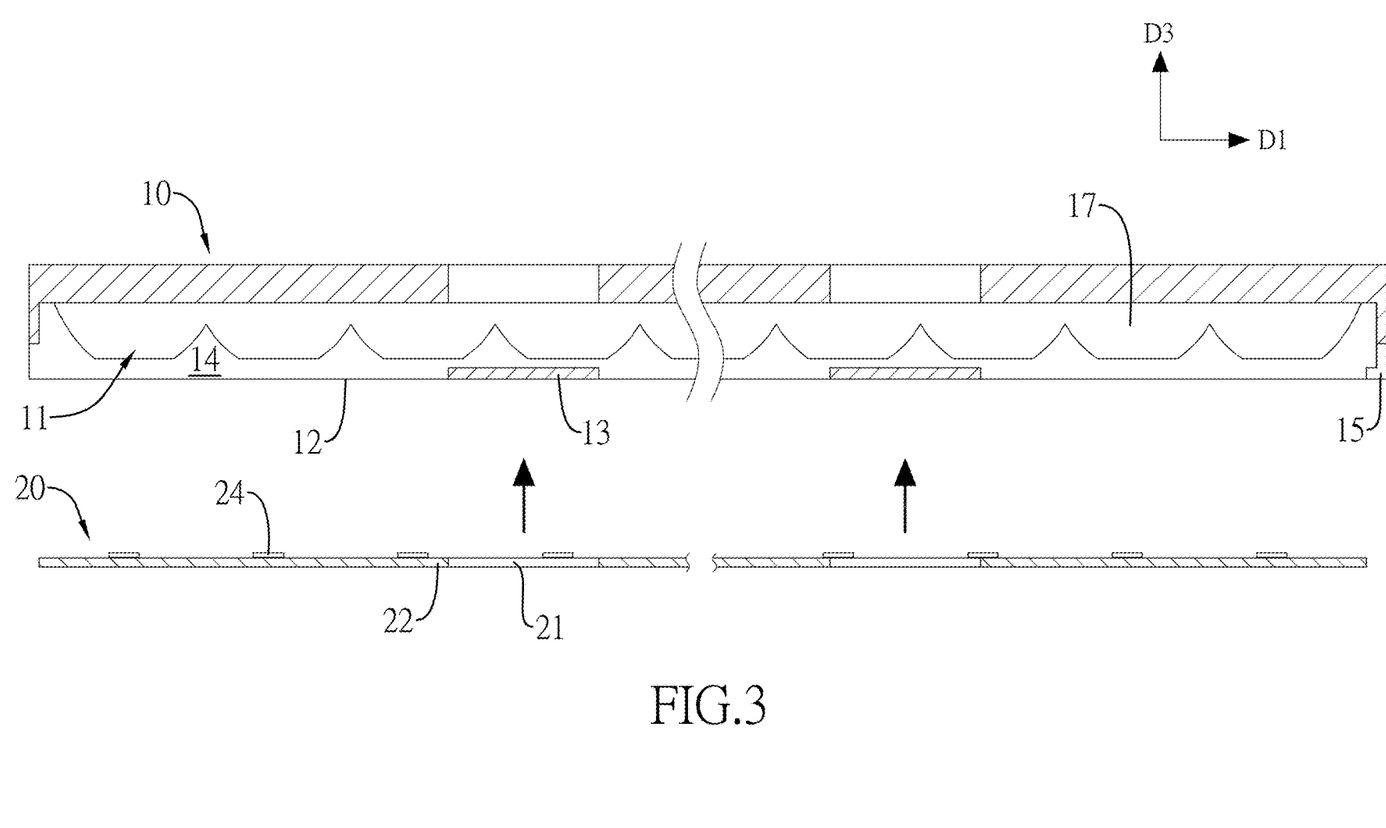
FIG. 3 is a pre-assembly cross-sectional side view of the reflective sheet and the light board in FIG. 1.

With reference to FIGS. 3 and 4, each one of the two sides of the light board 20 forms at least one position-limiting portion 22 being adjacent to the at least one recess portion 21. Specifically, an edge of the at least one recess portion forms the at least one position-limiting portion 22. After said tab 13 of the reflective sheet 10 passes through said recess portion 21 along a connecting direction D3, the light board 20 is located in the storage space 14 and configured to move along a first direction D1 such that said tab 13 is staggered from said recess portion 21 and abuts said position-limiting portion 22. Consequently, movement of the light board 20 along the first direction D1 creates engagement between the light board 20 and the reflective sheet 10 in other directions. E.g., said tab 13 limits a position of the light board 20 in the connecting direction D3 to prevent the light board 20 from departing from the reflective sheet 10 along the connecting direction D3, which ensures assembly stability of the reflective sheet 10 and the light board 20. In addition, the two side walls 12 are disposed at a spaced interval in a second direction D2. The light board 20 is located and limited between the two side walls 12 in the second direction D2, wherein the second direction D2 and the first direction D1 are non-parallel.

Moreover, with reference to FIGS. 1 to 3, the reflective sheet 10 has a positioning portion 15 located between the two side walls 12. Specifically, the reflective sheet 10 has a connecting wall connected between the two side walls 12, and the positioning portion 15 is formed on the connecting wall. The positioning portion 15, said tabs 13 of the two side walls 12, the two side walls 12, and the bottom of the body 11 jointly surround and form the storage space 14. The light board 20 is configured to abut the positioning portion 15 after moving along the first direction D1. By the positioning portion 15, the light board 20 is prevented from departing from the storage space 14 along the first direction D1, and said tab 13 of the reflective sheet 10 and said position-limiting portion 22 of the light board 20 are ensured to abut each other such that assembly stability of the light board 20 and the reflective sheet 10 is improved. Also, the positioning portion 15 is preferably located between the two side walls 12 that have said tab 13, which allows other sides of the light board 20 spaced from said tab 13 of the two side walls 12 to have their positions limited as well.

Additionally, each one of the two side walls 12 has multiple said tabs 13, and each one of the two sides of the light board 20 forms multiple said recess portions 21 and multiple said position-limiting portions 22 for the multiple tabs 13. Each one of the multiple tabs 13 corresponds to a respective one of the multiple recess portions 21 and a respective one of the multiple position-limiting portions 22 such that the light board 20 is limited on the reflective sheet 10 more stably. Furthermore, if the backlight module has long sides and short sides, preferably, the two side walls 12 are respectively located on two said long sides of the backlight module, so each one of the two side walls 12 may have more said tabs 13 to limit the reflective sheet 10 on the light board 20 even more stably.

Figure 5:
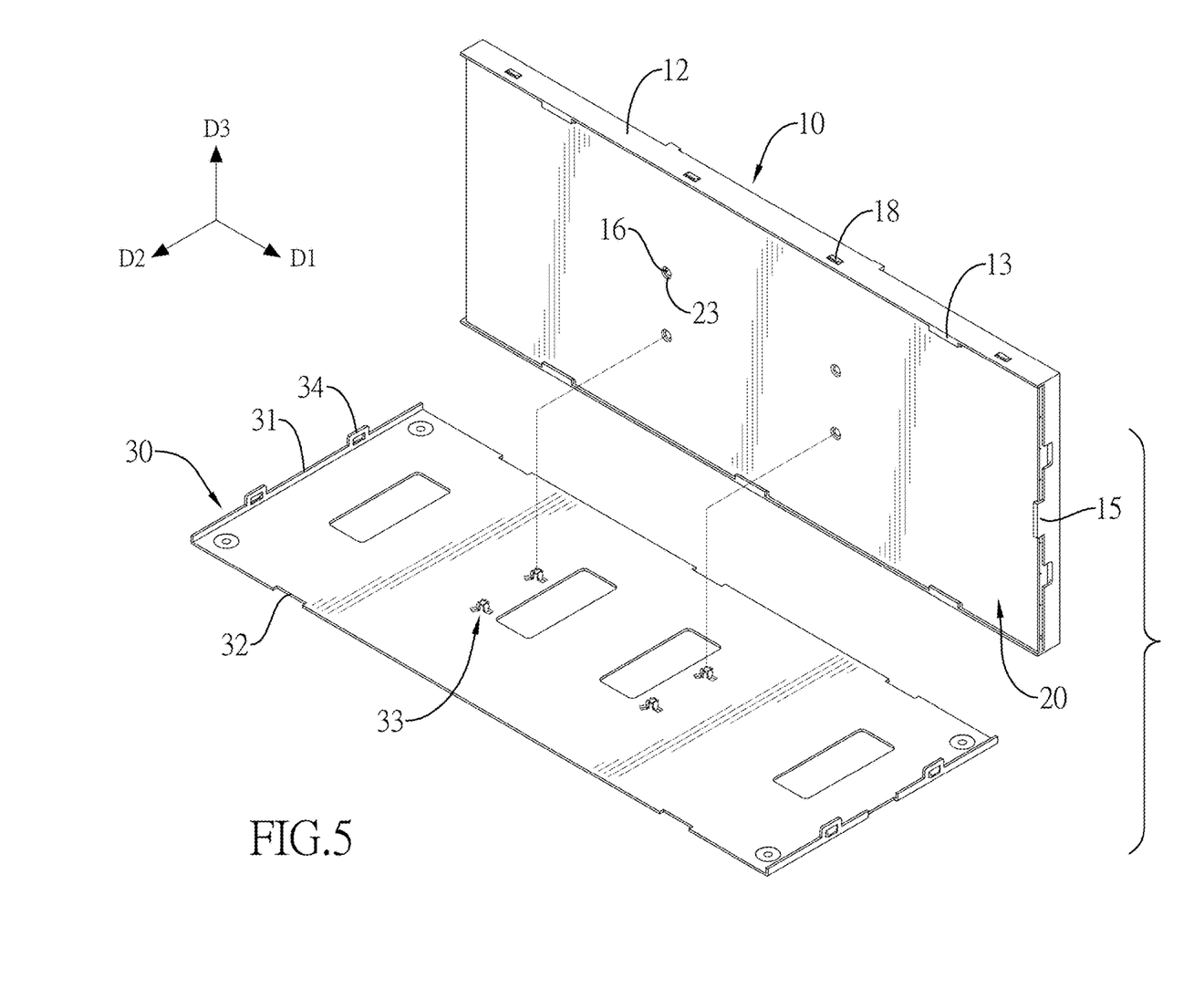
FIG. 5 is a partially exploded view of a backplate, the reflective sheet and the light board of the backlight module in accordance with the present invention.

With reference to FIG. 5, the backlight module has a backplate 30 connected with the reflective sheet 10. The light board 20 is located and limited between the backplate 30 and the reflective sheet 10; e.g. the light board 20 is limited between the backplate 30 and the reflective sheet 10 in the connecting direction D3. Also, the backplate 30, the light board 20, and the reflective sheet 10 are assembled together without extra components to reduce the quantity of the components of the backlight module. The backplate 30 may have different structures for assembly, which is described in detail later.

Figure 6:
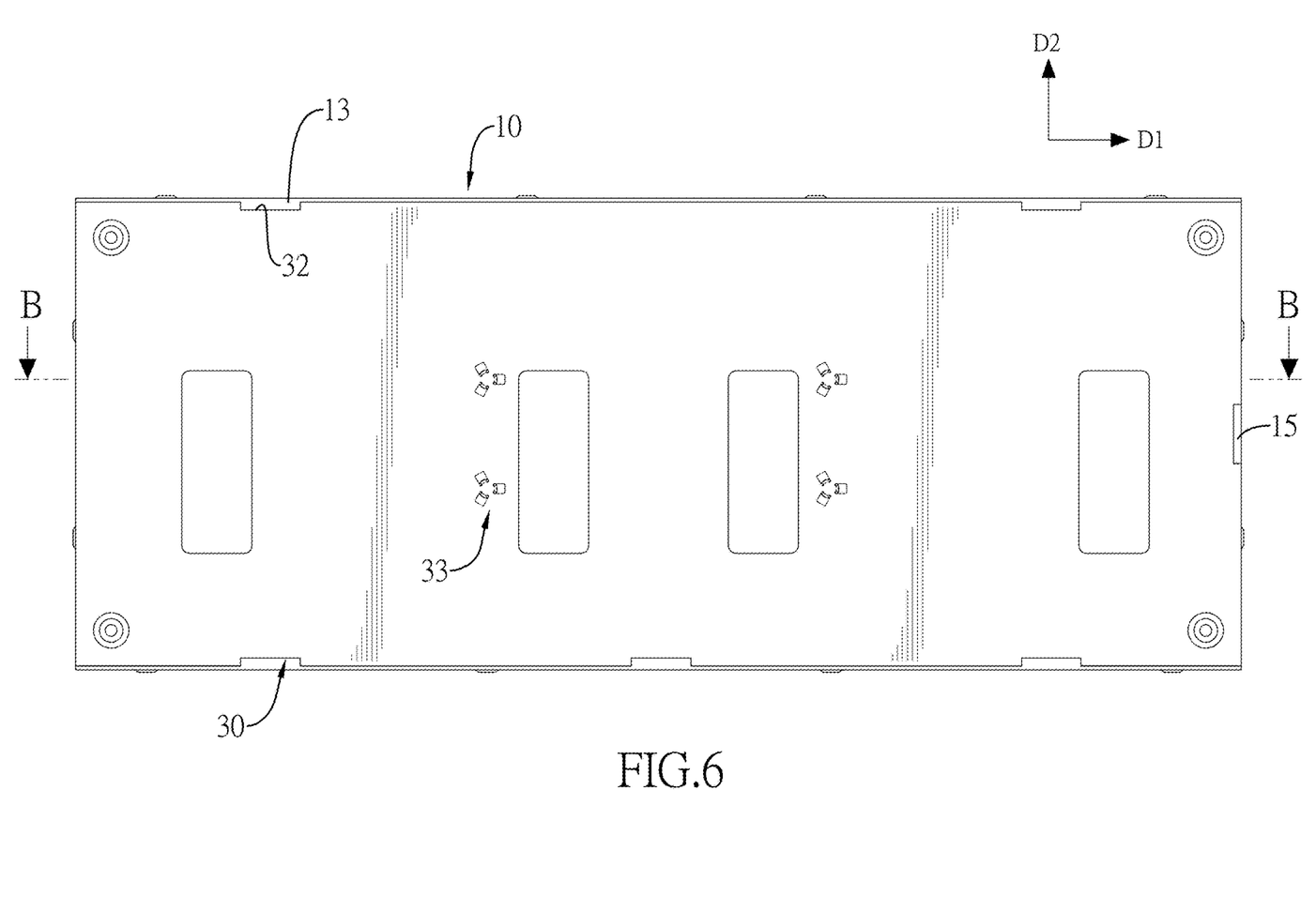
FIG. 6 is a bottom side view of the backplate in FIG. 5.

Besides, with reference to FIGS. 5 and 6, the backplate 30 has two borders 31 formed on an edge of the backplate 30. The two borders 31 and the two side walls 12 of the reflective sheet 10 are located at different positions and jointly surround the light board 20. Compared to a conventional backlight module that surrounds and forms a storage space via only a backplate, the reflective sheet 10 and the backplate 30 in the present invention jointly surround the storage space 14 to limit the light board 20 therein. Specifically, the two borders 31 are disposed at a spaced interval along the first direction D1 such that the backplate 30 limits the position of the light board 20 in the first direction D1. The backplate 30 has no wall disposed in the second direction D2, and the two side walls 12 are disposed at a spaced interval in the second direction D2. Thereby, the two side walls 12 and the two borders 31 are disposed at different positions in the backlight module and have no overlap, which is not only beneficial to narrow frame design to reduce labor time of assembling but also reduces a quantity of walls on the edge of the backplate 30 to lighten the backlight module.

Figure 7:
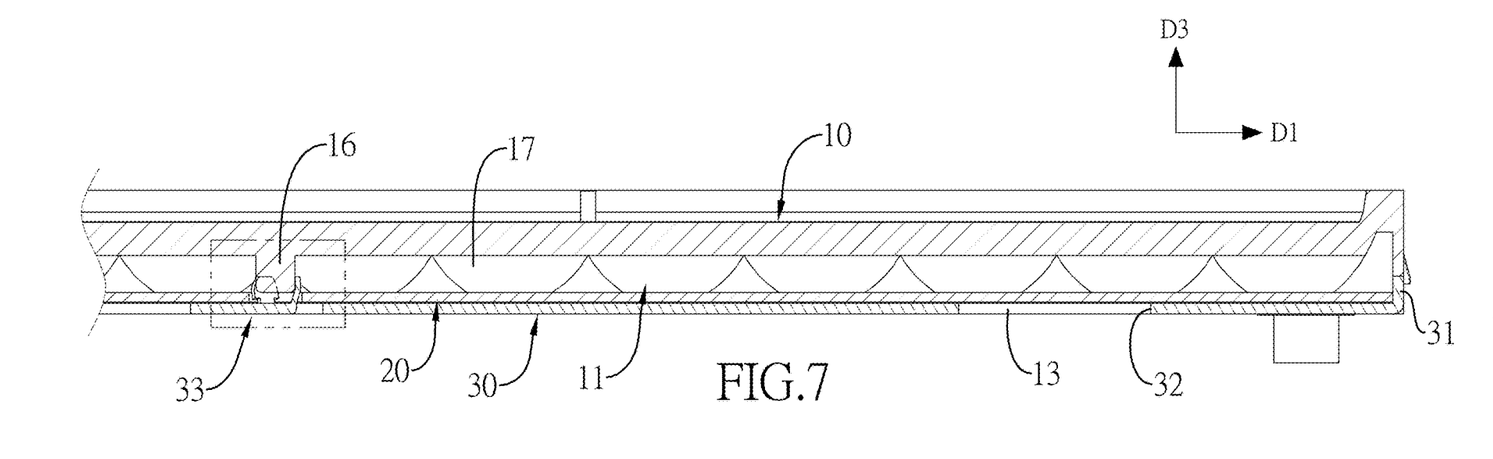
FIG. 7 is an enlarged cross-sectional side view across line B-B in FIG. 6.

Further, with reference to FIGS. 6 and 7, each one of two side edges of the backplate 30 forms at least one notch 32, and the position of the at least one notch 32 corresponds to that of the at least one tab 13 on a respective one of the two side walls 12. Therefore, said tab 13 can be located in said notch 32. Hence, said tab 13 and the backplate 30 are at a same height position in the connecting direction D3, so the backplate 30 can be disposed closely to the light board 20 to improve position-limiting efficacy, reduce a total thickness of the backlight module, and be beneficial to thin design for the backlight module.

Figure 8:
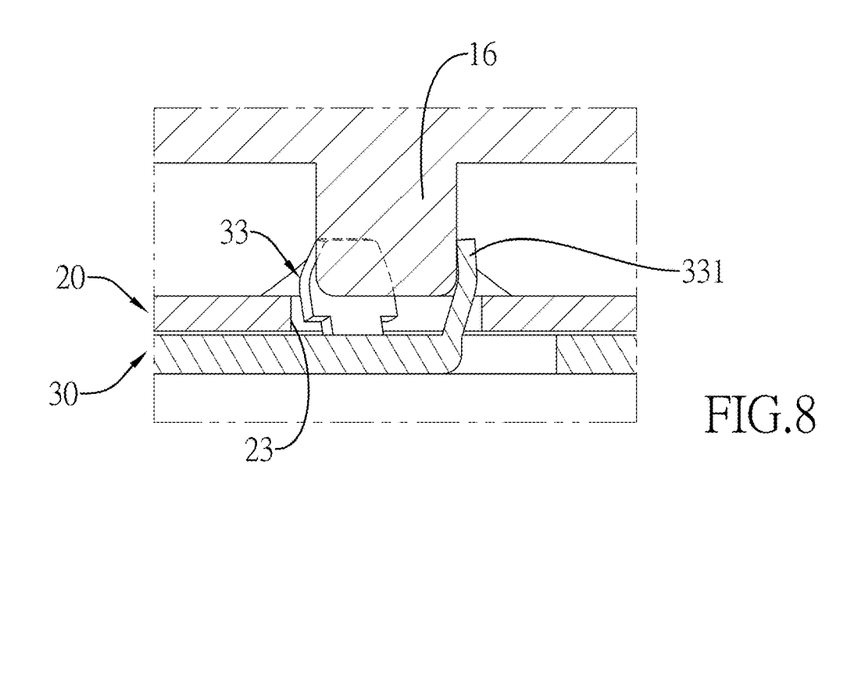
FIG. 8 is an enlarged view of FIG. 7.

Also, with reference to FIGS. 1, 7, and 8, the reflective sheet 10 has at least one connecting post 16 disposed on the body 11 and extending toward the backplate 30. The backplate 30 has at least one jaw structure 33, and the at least one jaw structure 33 is configured to grip the at least one connecting post 16 so as to connect the reflective sheet 10 and the backplate 30. Specifically, the backplate 30 moves toward the reflective sheet 10 along the connecting direction D3 and extends through at least one through hole 23 of the light board 20 to grip said connecting post 16 via said jaw structure 33, which also limits the position of the light board 20.

With reference to FIGS. 5 to 8, said jaw structure 33 has multiple jaws 331 disposed at spaced intervals, and the multiple jaws 331 are elastic and extend through the light board 20 to jointly grip said connecting post 16. When the multiple jaws 331 of said jaw structure 33 contact said connecting post 16, the multiple jaws 331 are spread apart by said connecting post 16 and become closer to an edge of said through hole 23 on the light board 20 to limit the position of the light board 20. Further, since the multiple jaws 331 are elastic, the backplate 30 can be detached without damaging said jaw structure 33 when reworking such that the backplate 30 can be detached and reassembled with other components without material waste. Also, said jaw structure 33 saves labor time for cleaning scraps caused by detaching screws, which improves convenience of reworking.

Additionally, the body 11 of the reflective sheet 10 has multiple reflector cups 17, and the light board 20 has multiple light-emitting units 24 disposed at spaced intervals. Each one of the multiple light-emitting units 24 reaches into a respective one of the multiple reflector cups 17 for emitting light. The at least one connecting post 16 is formed between adjacent two of the multiple reflector cups 17 such that the at least one connecting post 16 has no influence on optical taste of the backlight module. Moreover, the backplate 30 has multiple jaw structures 33 disposed at spaced intervals, and correspondingly, the reflective sheet 10 has multiple connecting posts 16. Each one of the multiple jaw structures 33 grips a respective one of the multiple connecting posts 16. By increasing a quantity of said jaw structures 33, assembly stability of the backplate 30 and the reflective sheet 10 is improved.

Figure 9:
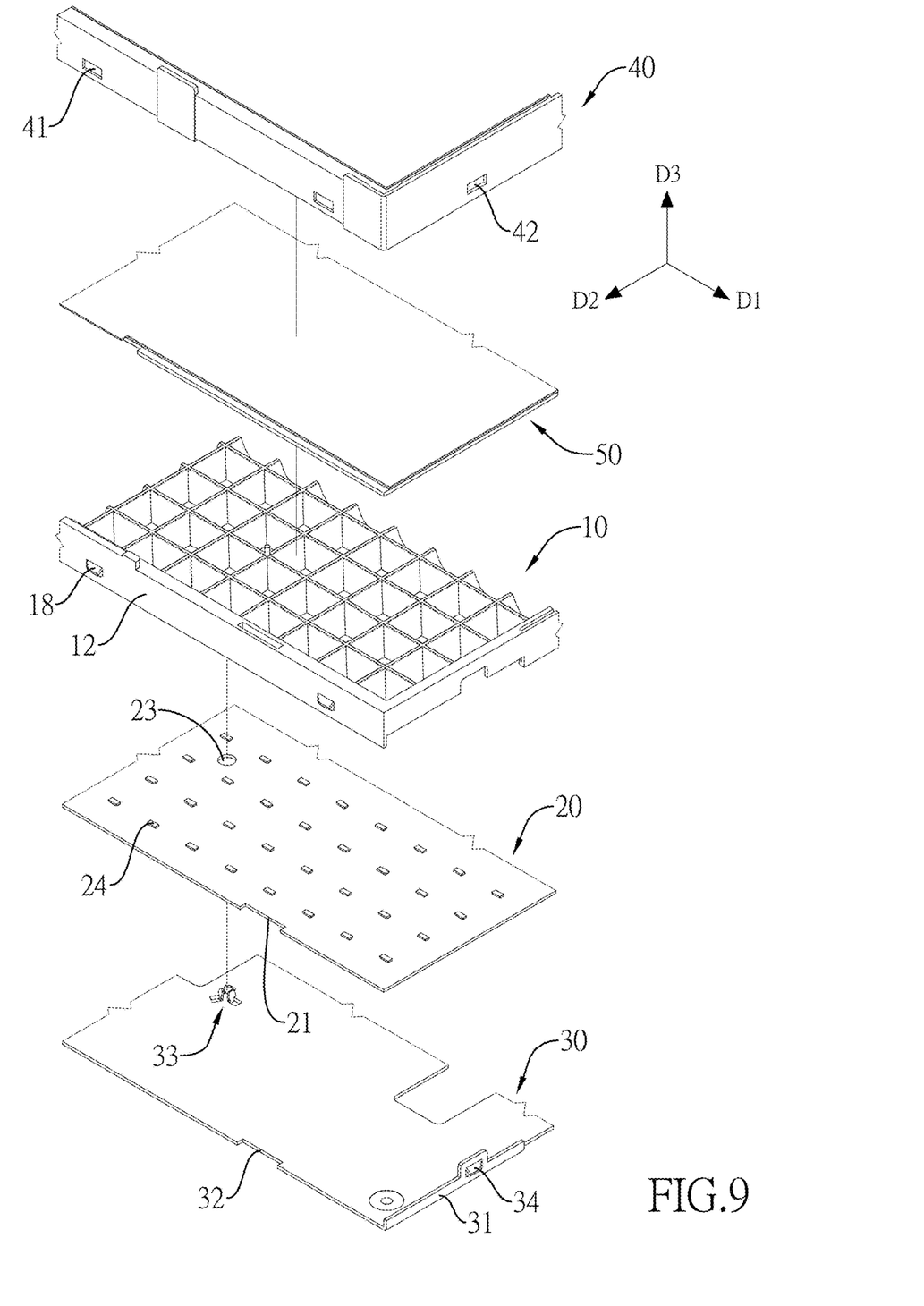
FIG. 9 is an exploded view of a part of the backlight module in accordance with the present invention.
Figure 10:
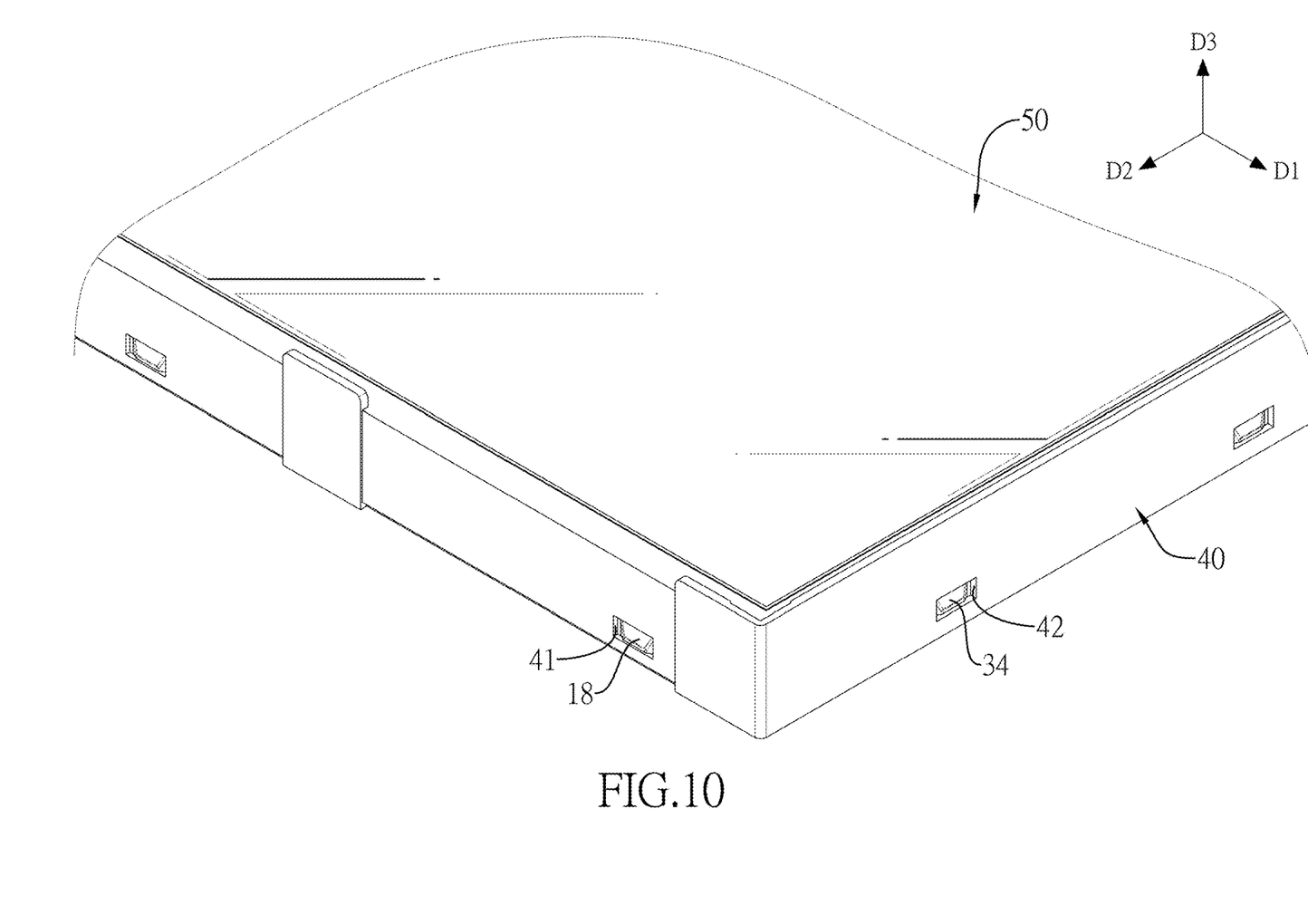
FIG. 10 is an enlarged perspective view of the backlight module in FIG. 9.
Figure 11:
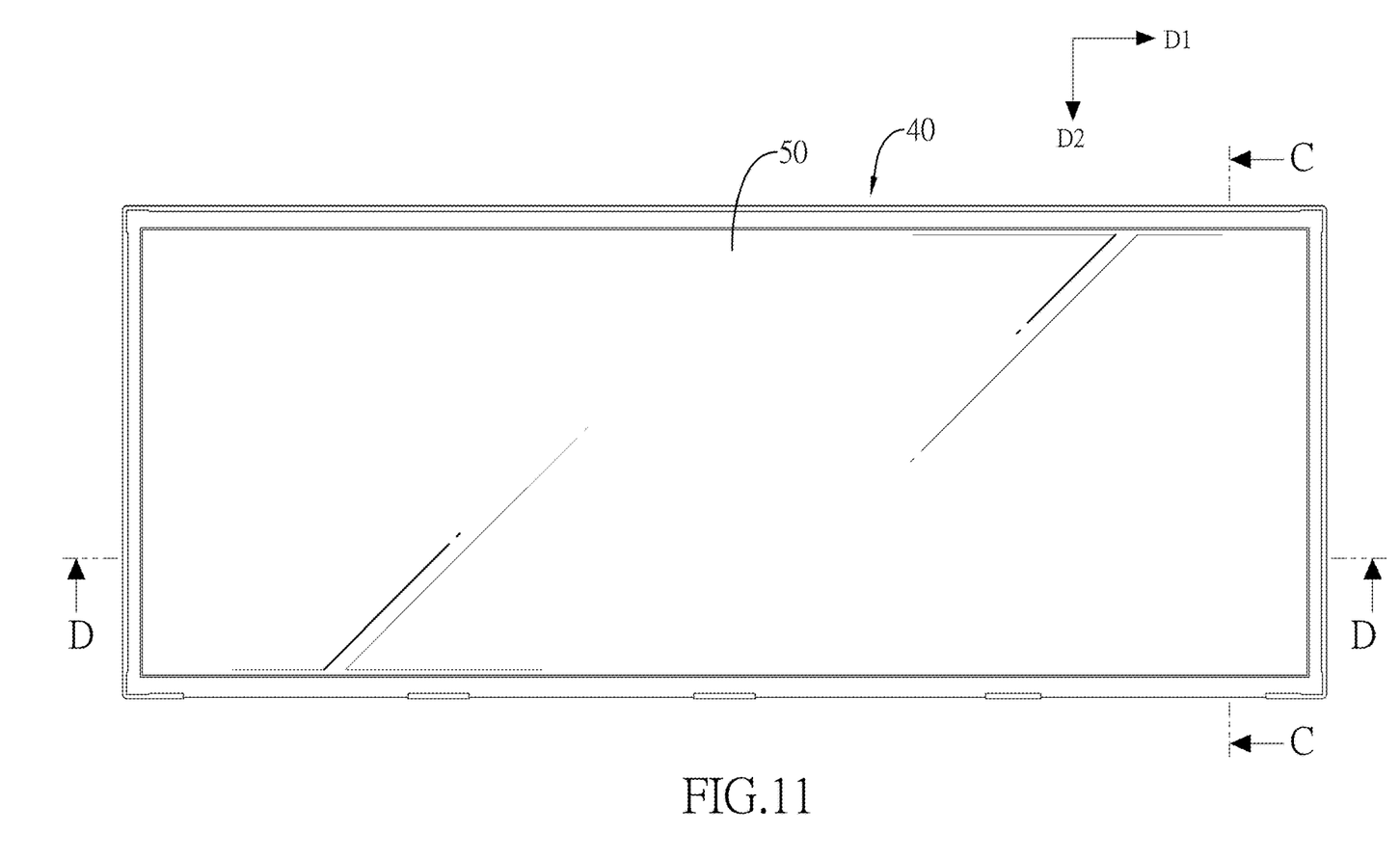
FIG. 11 is a top side view of the backlight module in FIG. 9.
Figure 12:
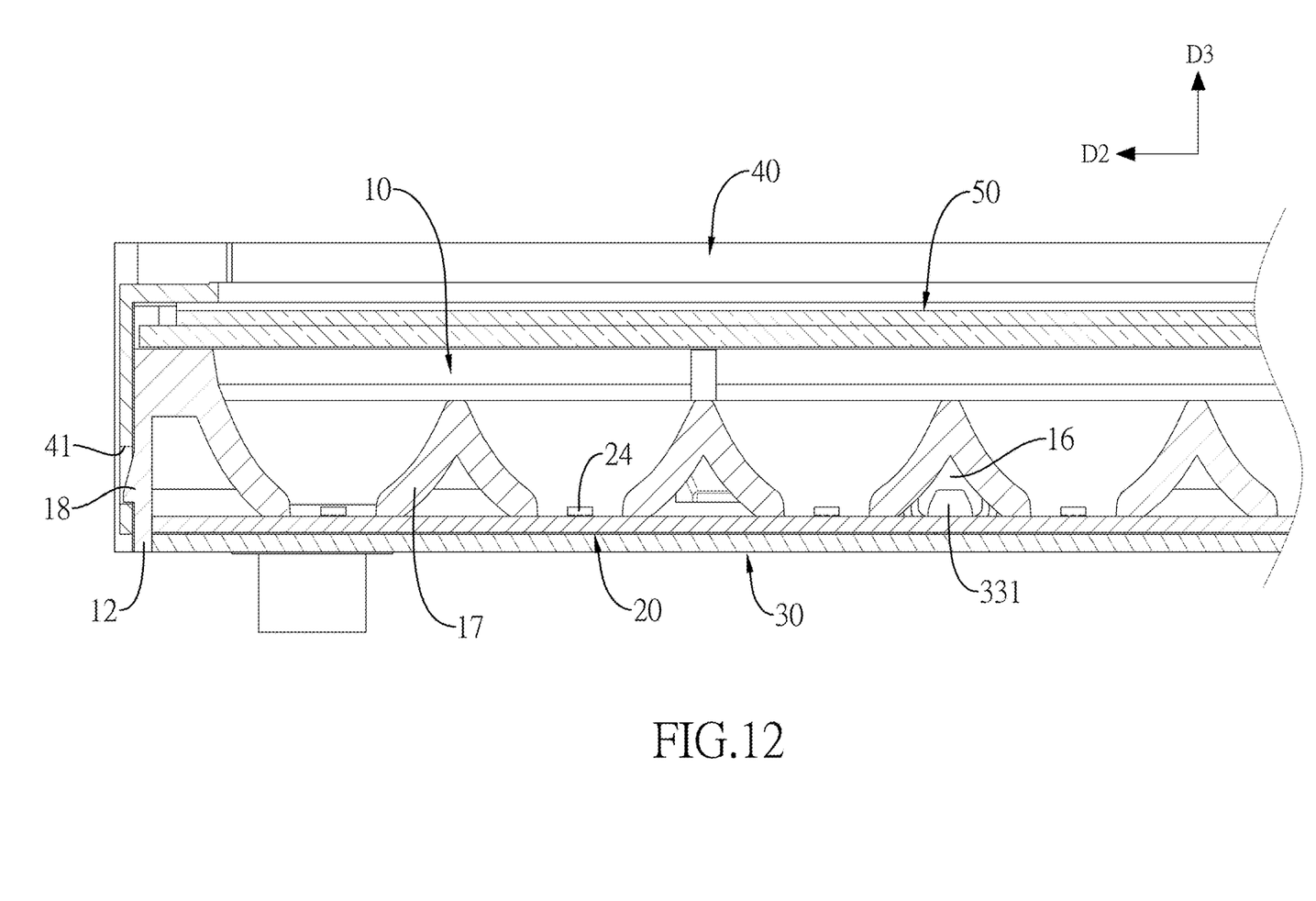
FIG. 12 is an enlarged cross-sectional side view across line C-C in FIG. 11 depicting connecting structures between a frame and the reflective sheet.

With reference to FIGS. 9 to 11, the backlight module has a frame 40 having multiple first engaging portions 41, wherein the multiple first engaging portions 41 are spaced from each other along a first axis. The reflective sheet 10 has multiple second engaging portions 18 located on the two side walls 12. Each one of the multiple first engaging portions 41 is connected with a respective one of the multiple second engaging portions 18 to connect the frame 40 and the reflective sheet 10. Thus, the frame 40 needs no extra components to be assembled with other components, which improves convenience of assembly of the backlight module. In the preferred embodiment, the first axis extends in the first direction D1.

Additionally, with reference to FIGS. 9 to 12, in the preferred embodiment, said first engaging portion 41 is a hole, and said second engaging portion 18 is a protrusion. Each one of the multiple second engaging portions 18 reaches into the corresponding first engaging portion 41 to be connected therewith and limited therein. In other embodiments, said first engaging portion 41 may be a protrusion with said second engaging portion 18 being a hole, which also allows said first engaging portion 41 and said second engaging portion 18 to be connected with each other.

Furthermore, with reference to FIGS. 9 and 10, the frame 40 has multiple first connecting portions 42 spaced from each other along a second axis, wherein the second axis and the first axis are non-parallel. The backplate 30 has multiple second connecting portions 34. Each one of the multiple first connecting portions 42 is connected with a respective one of the multiple second connecting portions 34 to connect the frame 40 and the backplate 30. Thereby, the frame 40 is connected with both the backplate 30 and the reflective sheet 10, and the backplate 30 directly connected with the reflective sheet 10 is also indirectly connected with the reflective sheet 10 via the frame 40. By connections between aforementioned components, assembly stability of the whole backlight module is improved. Preferably, in the preferred embodiment, the second axis extends in the second direction D2. The multiple second connecting portions 34 are formed on said border 31 of the backplate 30, wherein said border 31 and said side wall 12 of the reflective sheet 10 are disposed at different positions. Thence, the different sides of the frame 40 are connected with the backplate 30 and the reflective sheet 10 respectively, which improves assembly stability of the frame 40 with other components even more.

Figure 13:
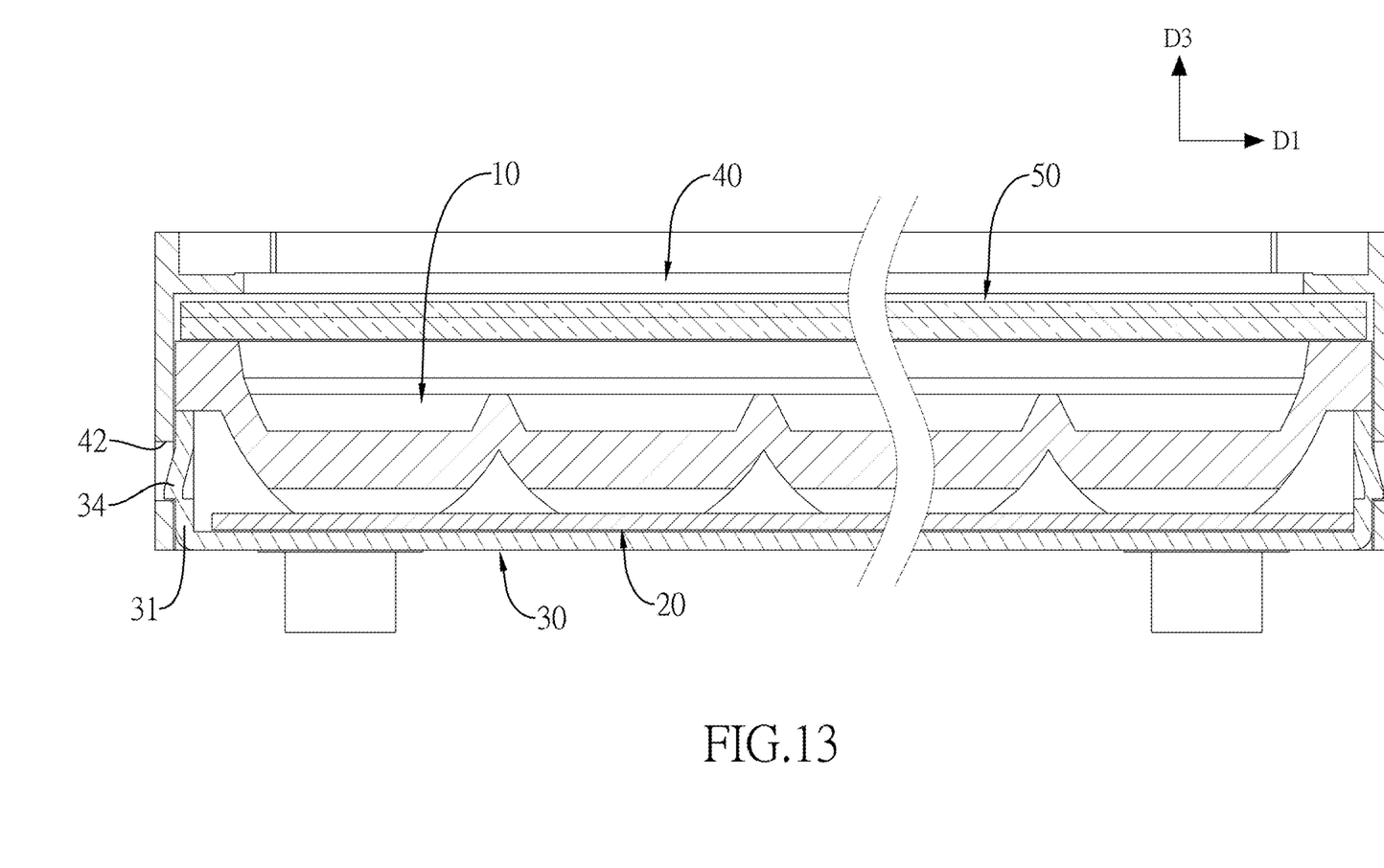
FIG. 13 is an enlarged cross-sectional side view across line D-D in FIG. 11 depicting connecting structures between the frame and the backplate.

Besides, with reference to FIGS. 9 and 13, in the preferred embodiment, said first connecting portion 42 is a hole, and said second connecting portion 34 is a protrusion. Each one of the multiple second connecting portions 34 reaches into the corresponding first connecting portion 42 to be connected therewith and limited therein. In other embodiments, said first connecting portion 42 may be a protrusion with said second connecting portion 34 being a hole, which also allows said first connecting portion 42 and said second connecting portion 34 to be connected with each other.

Briefly, after the position of the light board 20 in the connecting direction D3 is limited to prevent the light board 20 from departing from the reflective sheet 10 along the connecting direction D3, the reflective sheet 10 is then fixed between the backplate 30 and the frame 40. With reference to FIGS. 7 and 8, in the connecting direction D3, the backplate 30 moves toward the reflective sheet 10 along the connecting direction D3 and is mounted through the at least one through hole 23 of the light board 20 to grip the at least one connecting post 16 via the at least one jaw structure 33. Also, with reference to FIG. 12, in the first direction D1, said first engaging portion 41 of the frame 40 and said second engaging portion 18 of the reflective sheet 10 are connected with each other to mutually limit positions thereof. Further, with reference to FIG. 13, in the second direction D2, said first connecting portion 42 of the frame 40 and said connecting portion 34 of the backplate 30 are connected with each other to mutually limit positions thereof. Hence, the preferred embodiment achieves supporting and fixing effect in mechanism design via the multiple connections of the aforementioned components.

With reference to FIGS. 9 and 10, the backlight module has at least one optical film 50. The at least one optical film 50 is located on a side of the reflective sheet 10 away from the light board 20 and located between the frame 40 and the reflective sheet 10 to be limited therebetween, which improves assembly stability of the at least one optical film 50 with other components.

Figure 14:
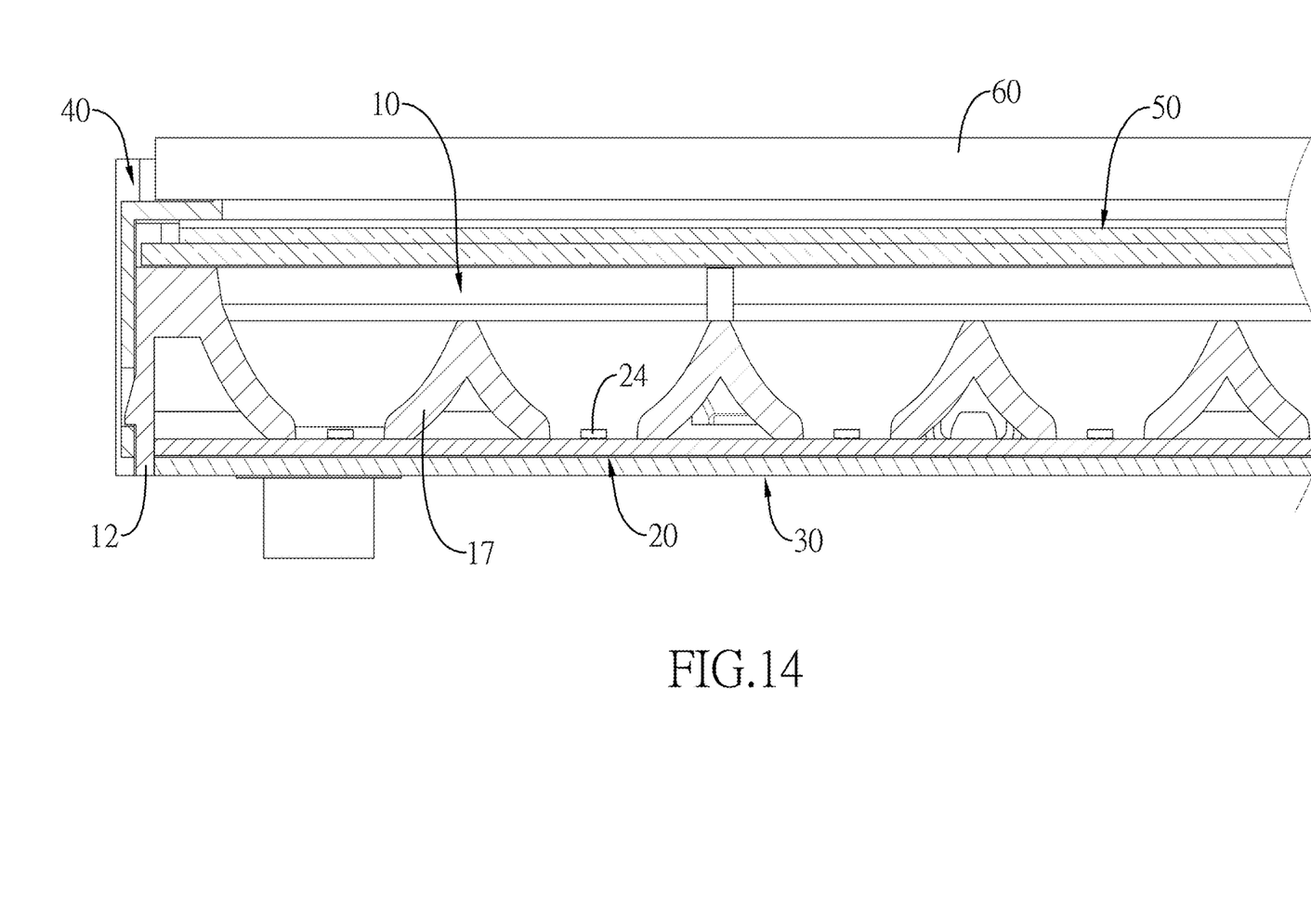
FIG. 14 is an enlarged cross-sectional side view of a display device in accordance with the present invention.

With reference to FIG. 14, the present invention further provides a preferred embodiment of a display device having the aforementioned backlight module and a display panel 60. The display panel 60 is connected with the backlight module, and the light board 20 faces toward the display panel 60 to emit light to the display panel 60. Applied with the backlight module, the display device in accordance with the present invention adopts a lower quantity of components and reduces total flashes or burrs on the components to reduce labor time for assembling, reworking, and deburring as well as production costs and also reduce labor time for reworking and materials cost due to poor assembly. Specifically, the backlight module in accordance with the present invention takes about 15 seconds to be assembled and about 5 seconds to be disassembled for reworking, yet the conventional backlight module assembled via screws takes about 25 seconds to be assembled and about 15 seconds to be disassembled for reworking. Accordingly, the backlight module in accordance with the present invention certainly reduces labor time for assembling and reworking.

In summary, the backlight module in accordance with the present invention connects and assembles the reflective sheet 10, the light board 20, the backplate 30, the frame 40, and said optical film 50 by structure design on these components to adopt a lower quantity of components, which not only reduces labor time for assembling, reworking, and deburring as well as production costs but also prevents poor assembly accuracy caused by assembling a large quantity of components so as to increase the yield rate and prevent reworking.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A backlight module comprising:
   a reflective sheet having
      a body; and
      two side walls respectively located on two sides of the body, being opposite to each other, and each one of the two side walls having at least one tab; and
      a storage space formed between said tabs of the two side walls, the two side walls, and a bottom of the body; and
   a light board disposed in the storage space and having multiple light-emitting units disposed thereon at spaced intervals; and
      two sides, each one of the two sides having
         at least one recess portion recessed thereon and configured for the at least one tab of a respective one of the two side walls to pass therethrough;
   wherein said tabs of the two side walls limit the light board to be mounted on the reflective sheet.

2. The backlight module as claimed in claim 1, wherein each one of the two sides of the light board forms at least one position-limiting portion being adjacent to the at least one recess portion;
   an edge of the at least one recess portion forms the at least one position-limiting portion; and
   the light board is configured to move along a first direction in the storage space after each one of said at least one tab passes through a corresponding one of said at least one recess portion along a connecting direction, such that each one of said at least one tab is staggered from the corresponding recess portion and abuts a corresponding one of said at least one position-limiting portion along the connecting direction to limit the light board in the storage space.

3. The backlight module as claimed in claim 1, wherein the reflective sheet has a connecting wall connected between the two side walls;
   the reflective sheet has a positioning portion formed on the connecting wall, located between the two side walls, and jointly surrounding the storage space with said tabs of the two side walls, the two side walls, and the body; and
   the light board is configured to abut the positioning portion after moving along the first direction to be positioned inside the storage space.

4. The backlight module as claimed in claim 1, wherein the backlight module has a backplate connected with the reflective sheet; and
   the light board is located and limited between the backplate and the body of the reflective sheet.

5. The backlight module as claimed in claim 4, wherein the reflective sheet has at least one connecting post disposed on the body and extending toward the backplate; and
   the backplate has at least one jaw structure configured to grip the at least one connecting post to connect the backplate and the reflective sheet.

6. The backlight module as claimed in claim 5, wherein each one of said at least one jaw structure has multiple jaws disposed at spaced intervals, being elastic, and extending through the light board to jointly grip a corresponding one of the at least one connecting post.

7. The backlight module as claimed in claim 4, wherein each one of two side edges of the backplate has at least one notch formed thereon;
   the position of the at least one notch corresponds to that of the at least one tab on a respective one of the two side walls; and
   the at least one tab is located in the at least one notch of the backplate.

8. The backlight module as claimed in claim 4, wherein the backplate has two borders located on an edge of the backplate; and
   the two borders of the backplate and the two side walls of the reflective sheet are located at different positions and jointly surround the light board.

9. The backlight module as claimed in claim 4, wherein the backlight module has a frame having multiple first engaging portions spaced from each other along a first axis;
   the reflective sheet has multiple second engaging portions located on the two side walls of the reflective sheet;
   each one of the multiple first engaging portions is connected to a respective one of the multiple second engaging portions; and
   each one of the multiple first engaging portions and the respective second engaging portion are respectively a protrusion and a hole.

10. The backlight module as claimed in claim 9, wherein the frame has multiple first connecting portions spaced from each other along a second axis which is non-parallel to the first axis;
    the backplate has multiple second connecting portions;
    each one of the multiple first connecting portions is connected to a respective one of the multiple second connecting portions; and
    each one of the multiple first connecting portions and the respective second connecting portion are respectively a protrusion and a hole.

11. The backlight module as claimed in claim 9, wherein the backlight module has at least one optical film located on a side of the reflective sheet away from the light board, and located between the reflective sheet and the frame.

12. A display device comprising:
    the backlight module as claimed in claim 1; and
    a display panel connected with the backlight module;
    wherein the light board of the backlight module faces toward the display panel.

* * * * *